US011720009B2

(12) United States Patent
Liu

(10) Patent No.: US 11,720,009 B2
(45) Date of Patent: Aug. 8, 2023

(54) ILLUMINATION SYSTEM AND PROJECTION DEVICE

(71) Applicant: Coretronic Corporation, Hsin-Chu (TW)

(72) Inventor: Hung-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/471,154

(22) Filed: Sep. 9, 2021

(65) Prior Publication Data

US 2022/0121094 A1 Apr. 21, 2022

(30) Foreign Application Priority Data

Oct. 21, 2020 (CN) ........................ 202022350134.X

(51) Int. Cl.
*G03B 21/20* (2006.01)
*G02B 27/14* (2006.01)
*G02B 27/28* (2006.01)

(52) U.S. Cl.
CPC ......... *G03B 21/204* (2013.01); *G02B 27/141* (2013.01); *G02B 27/283* (2013.01); *G03B 21/208* (2013.01); *G03B 21/2013* (2013.01)

(58) Field of Classification Search
CPC ......................... G03B 21/204; G03B 21/2013; G03B 21/208; G03B 21/2066; G03B 33/08; G02B 27/141; G02B 27/283; G02B 26/008
See application file for complete search history.

(56) References Cited

U.S. PATENT DOCUMENTS 9,131,165 B2 9/2015 Takahashi et al.
2012/0147331 A1* 6/2012 Miyazaki ............. H04N 9/3164 353/31
2013/0094001 A1* 4/2013 Oda ..................... H04N 9/3182 353/121
2015/0286119 A1* 10/2015 Miyazaki ............. G02B 27/102 362/231
2017/0315430 A1* 11/2017 Wang ................... G02B 26/008
2019/0331997 A1* 10/2019 Pan ...................... G03B 21/208
2019/0346752 A1* 11/2019 Pan ...................... G03B 21/204
2021/0247677 A1* 8/2021 Chen .................. G03B 21/2066

FOREIGN PATENT DOCUMENTS

CN 103376634 10/2013
CN 107656413 2/2018
CN 209545157 10/2019

* cited by examiner

*Primary Examiner* — Magda Cruz
(74) *Attorney, Agent, or Firm* — JCIPRNET

(57) ABSTRACT

An illumination system configured to provide an illumination beam is provided. At a timing for blue light, first blue light penetrates a light homogenizing element, so that the illumination system outputs blue light of the illumination beam. At a timing for green light, the first blue light is converted into first green light via a phosphor wheel and penetrates the light homogenizing element. At the same time, second blue light is converted into second green light via the phosphor wheel and penetrates the light homogenizing element, so that the illumination system outputs green light of the illumination beam. A projection device is also provided. According to the illumination system and the projection device provided herein, each light source may be effectively utilized.

38 Claims, 12 Drawing Sheets

110A
120S
B1
110C
120"
500
130S
110B
140
130"
190"
400
180"
150
I
100"

ILLUMINATION SYSTEM AND PROJECTION DEVICE

CROSS-REFERENCE TO RELATED APPLICATION

This application claims the priority benefit of China application serial no. 202022350134.X, filed on Oct. 21, 2020. The entirety of the above-mentioned patent application is hereby incorporated by reference herein and made a part of this specification.

BACKGROUND OF THE INVENTION

1. Field of the Invention

The invention relates to an optical system and an optical device, and in particular, to an illumination system and a projection device.

2. Description of Related Art

For an illumination system or a projection device using light sources, blue and red lasers are usually applied to generate blue light and red light, respectively. However, due to the immature development and low efficiency of green laser elements, green light is usually generated by applying a blue laser (for example, 455-nm blue laser) with a short wavelength to excite green phosphor.

In addition, for color gamut coverage and visual perception of human eyes, the illumination system and the projection device also use blue laser (for example, 465-nm blue laser) which has a relatively long wavelength and blue color points better complying with the color gamut standard.

For a single DLP/LCD projector, although the above-mentioned combinations of light sources may generate quality images, the light sources are turned on at respective timings, which results in a waste of usage efficiency. For example, the 465-nm blue laser light source is turned on during only 20% of one frame time but is turned off at the other times. Therefore, the result that the light source cannot be fully utilized is a waste of the overall efficiency of the illumination system and the projection device. Moreover, due to the significant differences in the utilization rate of each light source, degrees of light attenuation between the light sources are different, which leads to the issue of incorrect light colors gradually generated by the illumination system and the projection device as the time of use increases. Therefore, the user experience is poor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system and a projection device effectively utilizing each light source and better controlling the degree of light attenuation between the light sources.

An embodiment of the invention provides an illumination system configured to provide an illumination beam. The illumination system includes a first blue light source, a second blue light source, an optical path switching element, a first light splitting element, a phosphor wheel, and a light homogenizing element. The first blue light source is configured to emit first blue light. The second blue light source is configured to emit second blue light, and a peak wavelength of the first blue light is greater than a peak wavelength of the second blue light. The optical path switching element and the first light splitting element are disposed on a transmission path of the first blue light. The first light splitting element is disposed between the first blue light source and the light homogenizing element, and the optical path switching element is disposed between the first blue light source and the first light splitting element. The phosphor wheel is disposed on a transmission path of the second blue light. At a timing for blue light, the first blue light source is turned on, the second blue light source is not turned on, and the first blue light is sequentially transmitted to the optical path switching element and the first light splitting element and penetrates the light homogenizing element, so that the illumination system outputs blue light of the illumination beam. At a timing for green light, the first blue light source and the second blue light source are turned on simultaneously, and the first blue light is sequentially transmitted to the optical path switching element, the first light splitting element, and the phosphor wheel. The first blue light is converted into first green light via the phosphor wheel and penetrates the light homogenizing element after being transmitted to the first light splitting element. In addition, the second blue light is sequentially transmitted to the first light splitting element and the phosphor wheel, is converted into second green light via the phosphor wheel, and penetrates the light homogenizing element after being transmitted to the first light splitting element, so that the illumination system outputs green light of the illumination beam. The green light includes the first green light and the second green light.

An embodiment of the invention provides an illumination system configured to provide an illumination beam. The illumination system includes a first blue light source, a second blue light source, an optical path switching element, a first light splitting element, a phosphor wheel, and a light homogenizing element. The first blue light source is configured to emit first blue light. The second blue light source is configured to emit second blue light, and a peak wavelength of the first blue light is greater than a peak wavelength of the second blue light. The optical path switching element and the first light splitting element are disposed on a transmission path of the first blue light. The first light splitting element is disposed between the first blue light source and the light homogenizing element, and the optical path switching element is disposed between the first blue light source and the first light splitting element. The optical path switching element is an optical wheel and has a penetration region and a reflection region. The phosphor wheel is disposed on a transmission path of the second blue light. At a timing for blue light, the penetration region of the optical path switching element cuts into the transmission path of the first blue light, the first blue light source is turned on, the second blue light source is not turned on, and the first blue light emitted from the first blue light source sequentially penetrates the penetration region, the first light splitting element and the light homogenizing element, so that the illumination system outputs blue light of the illumination beam. At a timing for green light, the reflection region of the optical path switching element cuts into the transmission path of the first blue light, the first blue light source and the second blue light source are turned on simultaneously, and the first blue light emitted from the first blue light source is transmitted to the first light splitting element and the phosphor wheel after being reflected by the reflection region. The first blue light is converted into first green light via the phosphor wheel and the first green light penetrates the light homogenizing element after being transmitted to the first light splitting element. In addition, the second blue light emitted from the second blue light source is sequentially transmitted to the first light splitting element and the phosphor wheel, the second blue light is converted into second green light via the phosphor wheel, and the second blue light penetrates the light homogenizing element after being transmitted to the first light splitting element, so that the illumination system outputs green light of the illumination beam. The green light includes the first green light and the second green light.

An embodiment of the invention provides another illumination system configured to provide an illumination beam. The illumination system includes a first blue light source, a second blue light source, an optical path switching element, a first light splitting element, a phosphor wheel, a color filter wheel, and a light homogenizing element. The first blue light source is configured to emit first blue light. The second blue light source is configured to emit second blue light, and a peak wavelength of the first blue light is greater than a peak wavelength of the second blue light. The optical path switching element and the first light splitting element are disposed on a transmission path of the first blue light. The first light splitting element is disposed between the first blue light source and the light homogenizing element. The optical path switching element is disposed between the first blue light source and the first light splitting element and is a wavelength dichroic mirror that is penetrable by blue light and reflects light of other colors. The phosphor wheel is disposed on a transmission path of the second blue light. The color filter wheel is disposed between the first light splitting element and the light homogenizing element, wherein the color filter wheel has a green light region and a blue light region, and the green light region is penetrable by green light and reflects blue light. At a timing for blue light, the blue light region of the color filter wheel cuts into the transmission path of the first blue light, the first blue light source is turned on, the second blue light source is not turned on, and the first blue light emitted from the first blue light source is sequentially transmitted to the optical path switching element, the first light splitting element, the blue light region of the color filter wheel and penetrates the light homogenizing element, so that the illumination system outputs blue light of the illumination beam. At a timing for green light, the green light region of the color filter wheel cuts into the transmission path of the first blue light and a transmission path of green light transmitted from the phosphor wheel, the first blue light source and the second blue light source are turned on simultaneously, the first blue light emitted from the first blue light source is sequentially transmitted to the optical path switching element, the first light splitting element and is reflected by the green light region of the color filter wheel to be transmitted to the first light splitting element, and the first blue light reflected by the first light splitting element is transmitted to the phosphor wheel. The first blue light is converted into first green light via the phosphor wheel, the first green light is then transmitted to the first light splitting element, and penetrates the green light region and the light homogenizing element. In addition, the second blue light emitted from the second blue light source is sequentially transmitted to the first light splitting element and the phosphor wheel, the second blue light is converted into second green light via the phosphor wheel, and the second green light is then transmitted to the first light splitting element and penetrates the green light region and the light homogenizing element, so that the illumination system outputs green light of the illumination beam. The green light comprises the first green light and the second green light.

An embodiment of the invention provides a projection device. The projection device includes an illumination system, a light valve, and a projection lens. The illumination system is configured to provide an illumination beam. The light valve is disposed on a transmission path of the illumination beam, and is configured to convert the illumination beam into an image beam. The projection lens is disposed on a transmission path of the image beam, and is configured to project the image beam out of the projection device. The illumination system includes a first blue light source, a second blue light source, an optical path switching element, a first light splitting element, a phosphor wheel, and a light homogenizing element. The first blue light source is configured to emit first blue light. The second blue light source is configured to emit second blue light, and a peak wavelength of the first blue light is greater than a peak wavelength of the second blue light. The optical path switching element and the first light splitting element are disposed on a transmission path of the first blue light. The first light splitting element is disposed between the first blue light source and the light homogenizing element, and the optical path switching element is disposed between the first blue light source and the first light splitting element. The optical path switching element is an optical wheel and has a penetration region and a reflection region. The phosphor wheel is disposed on a transmission path of the second blue light. At a timing for blue light, the penetration region of the optical path switching element cuts into the transmission path of the first blue light, the first blue light source is turned on, and the second blue light source is not turned on. The first blue light emitted from the first blue light source sequentially penetrates the penetration region, the first light splitting element and the light homogenizing element, so that the illumination system outputs blue light of the illumination beam. At a timing for green light, the reflection region of the optical path switching element cuts into the transmission path of the first blue light, the first blue light source and the second blue light source are turned on simultaneously. The first blue light emitted from the first blue light source is transmitted to the first light splitting element and the phosphor wheel after being reflected by the reflection region. The first blue light is converted into first green light via the phosphor wheel and penetrates the light homogenizing element after being transmitted to the first light splitting element. In addition, the second blue light emitted from the second blue light source is sequentially transmitted to the first light splitting element and the phosphor wheel, the second blue light is converted into second green light via the phosphor wheel, and the second green light penetrates the light homogenizing element after being transmitted to the first light splitting element, so that the illumination system outputs green light of the illumination beam. The green light includes the first green light and the second green light.

An embodiment of the invention provides another projection device. The projection device includes an illumination system, a light valve, and a projection lens. The illumination system is configured to provide an illumination beam. The light valve is disposed on a transmission path of the illumination beam and configured to convert the illumination beam into an image beam. The projection lens is disposed on a transmission path of the image beam and configured to project the image beam out of the projection device. The illumination system includes a first blue light source, a second blue light source, an optical path switching element, a first light splitting element, a phosphor wheel, a color filter wheel, and a light homogenizing element. The first blue light source is configured to emit first blue light. The second blue light source is configured to emit second blue light, and a peak wavelength of the first blue light is greater than a peak wavelength of the second blue light. The optical path switching element and the first light splitting element are disposed on a transmission path of the first blue light, the first light splitting element is disposed between the first blue light source and the light homogenizing element, and the optical path switching element is disposed between the first blue light source and the first light splitting element and is a wavelength dichroic mirror that is penetrable by blue light and reflects light of other colors. The phosphor wheel is disposed on a transmission path of the second blue light. The color filter wheel is disposed between the first light splitting element and the light homogenizing element. The color filter wheel has a green light region and a blue light region, and the green light region is penetrable by green light and reflects blue light. At a timing for blue light, the blue light region of the color filter wheel cuts into the transmission path of the first blue light, the first blue light source is turned on, the second blue light source is not turned on, and the first blue light emitted from the first blue light source is sequentially transmitted to the optical path switching element, the first light splitting element, the blue light region of the color filter wheel and penetrates the light homogenizing element, so that the illumination system outputs blue light of the illumination beam. At a timing for green light, the green light region of the color filter wheel cuts into the transmission path of the first blue light and a transmission path of green light transmitted from the phosphor wheel, the first blue light source and the second blue light source are turned on simultaneously, the first blue light emitted from the first blue light source is sequentially transmitted to the optical path switching element, the first light splitting element and is reflected by the green light region of the color filter wheel to be transmitted to the first light splitting element, and the first blue light reflected by the first light splitting element is transmitted to the phosphor wheel. The first blue light is converted into first green light via the phosphor wheel, and the first green light is then transmitted to the first light splitting element and penetrates the green light region and the light homogenizing element. In addition, the second blue light emitted from the second blue light source is sequentially transmitted to the first light splitting element and the phosphor wheel, the second blue light is converted into second green light via the phosphor wheel, and the second green light is then transmitted to the first light splitting element, and penetrates the green light region and the light homogenizing element, so that the illumination system outputs green light of the illumination beam, wherein the green light comprises the first green light and the second green light.

Based on the above, in the illumination systems and the projection devices according to the embodiments of the invention, since the optical path switching element of the illumination system causes the first blue light to penetrate the optical path switching element at the timing for blue light, and causes the first blue light to be reflected at the timings for green light, the efficiency of the first blue light with a larger peak wavelength is effectively utilized, so that the overall efficiency of the illumination system and the projection device can be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
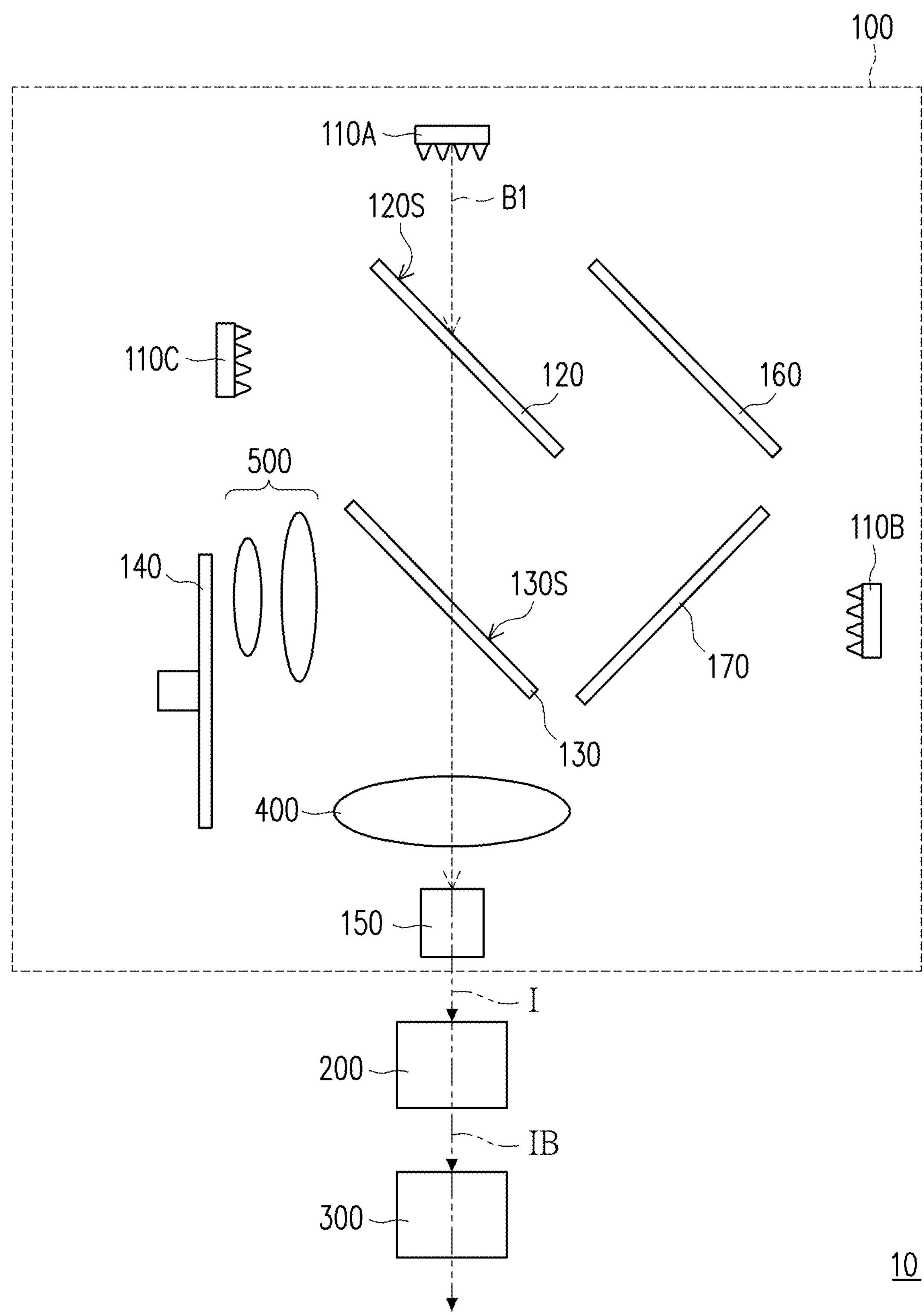
FIG. 1A is a schematic diagram of an optical path of a projection device at a timing for blue light according to a first embodiment of the invention.
Figure 1B:
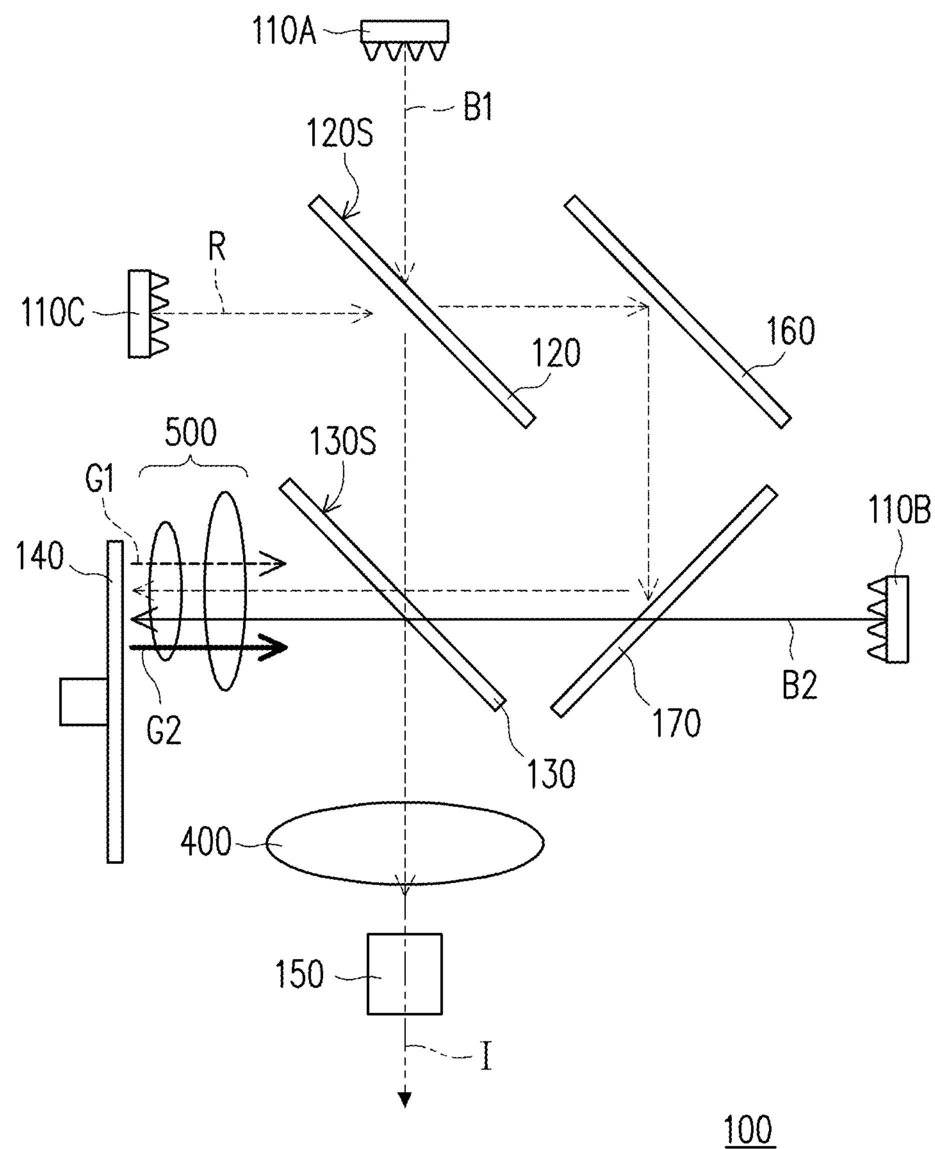
FIG. 1B is a schematic diagram of an optical path of a projection device at a timing for nonblue light according to a first embodiment of the invention.
Figure 1C:
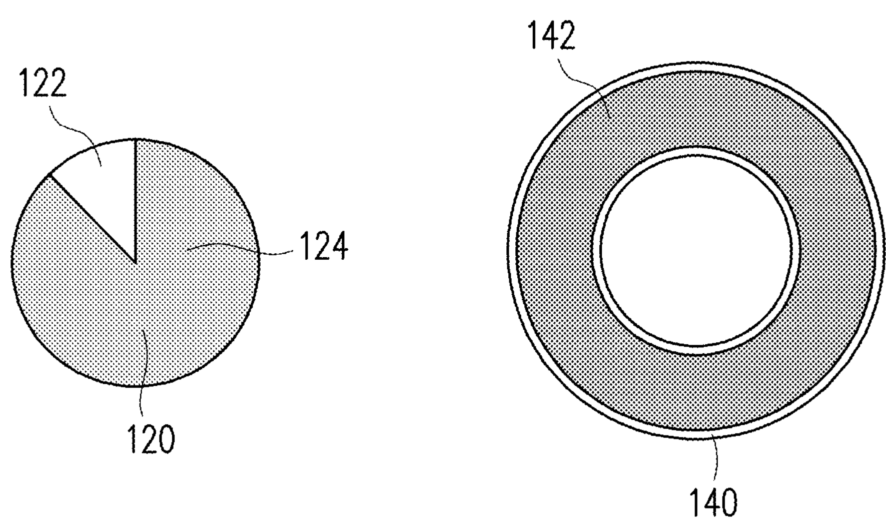
FIG. 1C is a schematic diagram of an optical path switching element and a phosphor wheel of a projection device according to an embodiment of the invention.

FIG. 1A is a schematic diagram of an optical path of a projection device at a timing for blue light according to a first embodiment of the invention. FIG. 1B is a schematic diagram of an optical path of a projection device at a timing for nonblue light according to a first embodiment of the invention. FIG. 1C is a schematic diagram of an optical path switching element and a phosphor wheel of a projection device according to an embodiment of the invention. First with reference to FIG. 1A and FIG. 1B, a projection device 10 of an embodiment of the invention includes an illumination system 100, a light valve 200, and a projection lens 300. The illumination system 100 is configured to provide an illumination beam I. The light valve 200 is disposed on a transmission path of the illumination beam I, and is configured to convert the illumination beam I into an image beam IB. The projection lens 300 is disposed on a transmission path of the image beam IB, and is configured to project the image beam IB out of the projection device 10. The illumination system 100 includes a first blue light source 110A, a second blue light source 110B, an optical path switching element 120, a first light splitting element 130, a phosphor wheel 140, and a light homogenizing element 150. The first blue light source 110A is configured to emit first blue light B1. The second blue light source 110B is configured to emit second blue light B2, and a peak wavelength of the first blue light B1 is greater than a peak wavelength of the second blue light. The optical path switching element 120 and the first light splitting element 130 are disposed on a transmission path of the first blue light B1. The first light splitting element 130 is disposed between the first blue light source 110A and the light homogenizing element 150, and the optical path switching element 120 is disposed between the first blue light source 110A and the first light splitting element 130. The phosphor wheel 140 is disposed on a transmission path of the second blue light B2.

In detail, the first blue light source 110A and the second blue light source 110B of the embodiment are, for example, laser diodes (LD) or other suitable light sources. A peak wavelength of the first blue light B1 emitted by the first blue light source 110A may be 465 nanometers (nm), and a peak wavelength of the second blue light B2 emitted by the second blue light source 110B may be 455 nanometers (nm), but the invention is not limited thereto.

With reference to FIG. 1A and FIG. 1C, in the embodiment, the optical path switching element 120 may be an optical wheel, and has a penetration region 122 and a reflection region 124. The penetration region 122 and the reflection region 124 may sequentially cut into the transmission path of the first blue light B1. The first light splitting element 130 may reflect green light, and may be penetrated by light of other colors. Furthermore, an optical disk surface 120S of the optical path switching element 122 and a light splitting surface 130S of the first light splitting element 130 are parallel to each other. In the embodiment, the phosphor wheel 140 has a phosphor region 142. The phosphor region 142 may be configured, for example, with a phosphor capable of being excited in order to convert incident blue light into green light. The light homogenizing element 150 is, for example, an integration rod, a lens array, or other optical elements with a light homogenization effect, but the invention is not limited thereto.

In the embodiment, the light valve 200 is, for example, a spatial light modulator such as a digital micro-mirror device (DMD), a liquid-crystal-on-silicon panel (LCOS panel), a liquid crystal panel (LCD), or the like. In addition, the projection lens 300 includes, for example, a combination of one or more dioptric optical lenses. The optical lens, for example, includes various combinations of non-planar lenses such as a biconcave lens, a biconvex lens, a meniscus lens, a convex-concave lens, a plano-convex lens, and a plano-concave lens. The invention does not limit the form and category of the projection lens 300.

Figure 2:
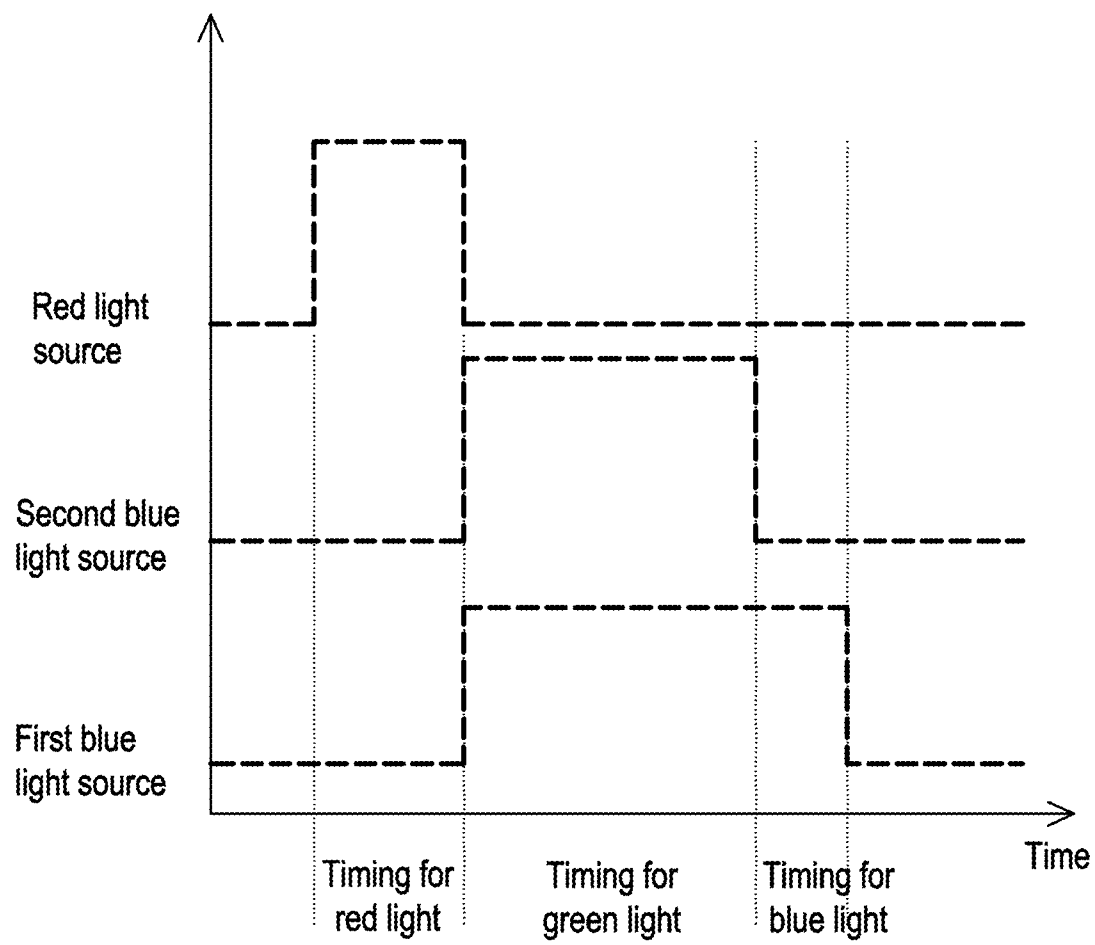
FIG. 2 is a schematic diagram of light sources being turned on at different timings in a first frame time according to an embodiment of the invention.

FIG. 2 is a schematic diagram of light sources being turned on at different timings in a first frame time according to an embodiment of the invention. With reference to FIG. 1A, FIG. 1C, and FIG. 2 together, at the timing for blue light of the embodiment, the first blue light source 110A is turned on, and the second blue light source 110B is not turned on. The first blue light B1 emitted by the first blue light source 110A is sequentially transmitted to the optical path switching element 120 and the first light splitting element 130 and penetrates the light homogenizing element 150, so that the illumination system 100 outputs blue light of the illumination beam I. When the illumination system 100 is at the timing for blue light, the penetration region 122 of the optical path switching element 120 cuts into the transmission path of the first blue light B1, where the first blue light B1 penetrates the penetration region 122 and is transmitted to the first light splitting element 130.

In an embodiment, the illumination system 100 further includes a lens 400. The lens 400 is disposed between the first light splitting element 130 and the light homogenizing element 150. The first blue light B1 penetrates the lens 400 and is transmitted to the light homogenizing element 150.

With reference to FIG. 1B, FIG. 1C, and FIG. 2 together, at the timing for green light of the embodiment, the first blue light source 110A and the second blue light source 110B are turned on simultaneously. The first blue light B1 emitted by the first blue light source 110A is sequentially transmitted to the optical path switching element 120, the first light splitting element 130, and the phosphor wheel 140. The first blue light B1 is converted into first green light G1 via the phosphor wheel 140. The first green light G1 is then reflected to the light homogenizing element 150 after being transmitted to the first light splitting element 130 and penetrates the light homogenizing element 150. In addition, the second blue light B2 emitted by the second blue light source 110B is sequentially transmitted to the first light splitting element 130 and the phosphor wheel 140, and is converted into the second green light G2 via the phosphor wheel 140. The second green light G2 is transmitted to the first light splitting element 130 and reflected to the light homogenizing element 150 and penetrates the light homogenizing element 150, so that the illumination system 100 outputs the green light of the illumination beam I. The green light includes the first green light G1 and the second green light G2. When the illumination system 100 is at the timing for green light, the reflection region 124 of the optical path switching element 120 cuts into the transmission path of the first blue light B1, where the first blue light B1 is transmitted to the first light splitting element 130 after being reflected by the reflection region 124. Furthermore, the phosphor region 142 of the phosphor wheel 140 is located on the transmission path of the first blue light B1 and the second blue light B2 from the first light splitting element 130. The first blue light B1 and the second blue light B2 are respectively converted into the first green light G1 and the second green light G2 via the phosphor region 142 of the phosphor wheel 140.

In an embodiment, the illumination system 100 further includes a lens group 500. The lens group 500 is disposed between the first light splitting element 130 and the phosphor wheel 140. The first blue light B1 and the second blue light B2 penetrate the lens group 500 and are transmitted to the phosphor wheel 140, and the first green light G1 and the second green light G2 penetrate the lens group 500 and are transmitted to the first light splitting element 130.

In the embodiment, the optical path switching element 120 is not located on the transmission path of the second blue light B2.

In the embodiment, the illumination system 100 further includes a reflector 160. The optical path switching element 120 is disposed between a red light source 110C and the reflector 160. When the illumination system 100 is at the timing for green light, the first blue light B1 is transmitted from the optical path switching element 120 to the first light splitting element 130 via reflection of the reflector 160.

In the embodiment, the illumination system 100 further includes a second light splitting element 170. The second light splitting element 170 is disposed between the first light splitting element 130 and the second blue light source 110B. The second light splitting element 170 may be a polarizing beam splitter or a wavelength dichroic mirror. When the illumination system 100 is at the timing for green light, the first blue light B1 is sequentially transmitted from the optical path switching element 120 and the reflector 160 to the first light splitting element 130 via the reflection of the second light splitting element 170, and the second blue light B2 first penetrates the second light splitting element 170 and is transmitted to the first light splitting element 130. In other words, when the second light splitting element 170 is a polarizing beam splitter, polarization states of the first blue light B1 and the second blue light B2 are different, and the second light splitting element 170 reflects the first blue light B1 and penetrated by the second blue light B2. The second light splitting element 170 allows s-polarized light to reflect, and may be penetrated by p-polarized light, or allows p-polarized light to reflect, and may be penetrated by s-polarized light, for example.

In an embodiment, the illumination system 100 further includes a lens 400. The lens 400 is disposed between the first light splitting element 130 and the light homogenizing element 150. The first blue light B1 penetrates the lens 400 and is transmitted to the light homogenizing element 150.

In the embodiment, the illumination system 100 further includes a red light source 110C configured to emit red light R. The red light source 110C is, for example, a laser diode (LD) or other suitable light sources. At a timing for red light, the red light R emitted from the red light source 110C sequentially penetrates through the first light splitting element 130 and the light homogenizing element 150 after being reflected by the reflection region 124 of the optical path switching element 120, so that the illumination system 100 outputs the red light of the illumination beam I. In the illumination system 100 according to an embodiment of the invention, since the illumination system 100 directly uses the red light R emitted by the red light source 110C as the red light of the illumination beam I, the illumination system 100 may output the illumination beam I with a wider color gamut range. Furthermore, the illumination system 100 uses red light, blue light, and green light as basic light colors, and therefore the illumination beam I has relatively high color light brightness.

Based on the above, in the illumination system 100 and the projection device 10 according to an embodiment of the invention, since the optical path switching element 120 of the illumination system 100 causes the first blue light B1 to penetrate the optical path switching element 120 at the timing for blue light, and causes the first blue light B1 to be reflected at the timings for green light, the efficiency of the first blue light B1 with a larger peak wavelength is effectively utilized, so that the overall efficiency of the illumination system 100 and the projection device 10 is improved. Furthermore, since the first blue light B1 brings a better visual experience for users, and the usage rate of the first blue light B1 is increased, the user experience is also better.

Figure 3:
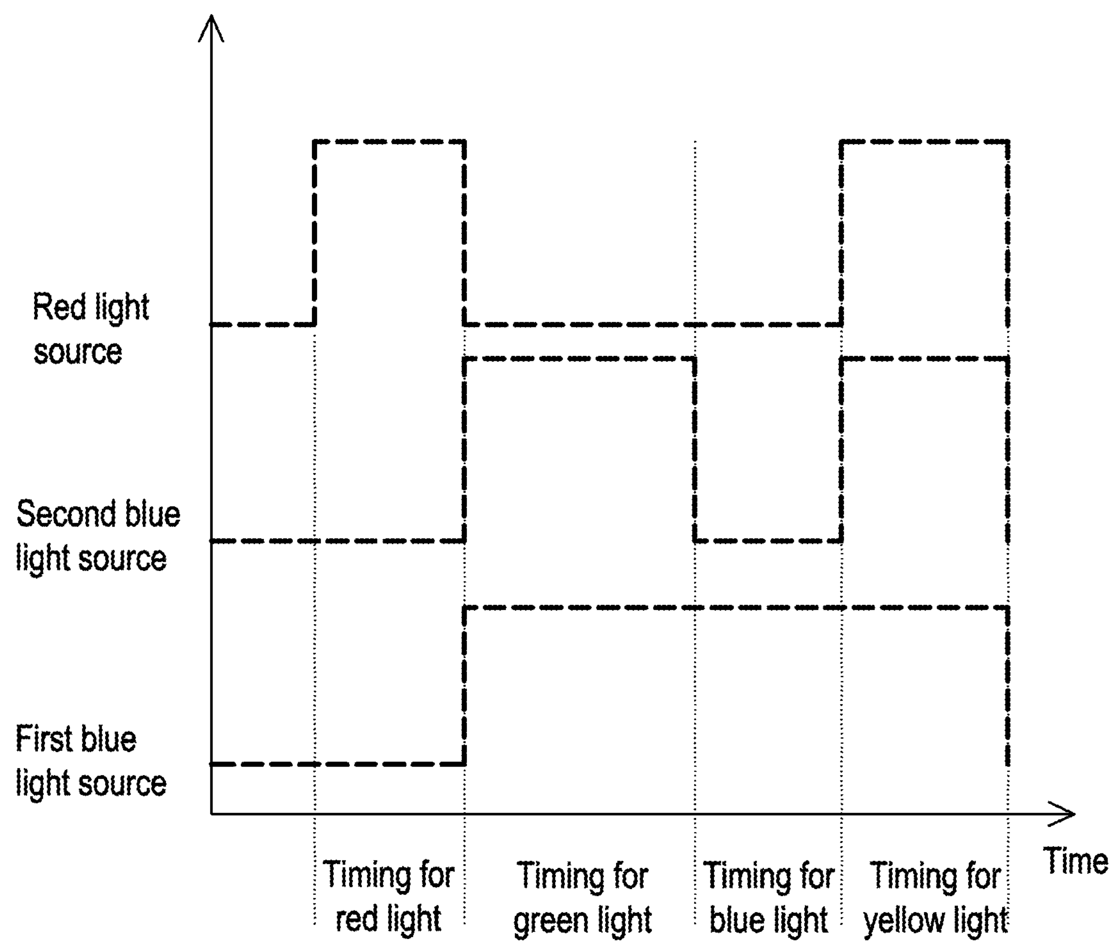
FIG. 3 is a schematic diagram of light sources being turned on at different timings in a second frame time according to an embodiment of the invention.

FIG. 3 is a schematic diagram of light sources being turned on at different timings in a second frame time according to an embodiment of the invention. A frame time depicted in FIG. 3 is similar to a frame time depicted in FIG. 2, and the main difference is: the frame time depicted in FIG. 3 further includes a timing for yellow light.

With reference to FIG. 1B and FIG. 3, at the timing for yellow light as provided in the embodiment, the first blue light source 110A, the second blue light source 110B, and the red light source 110C are turned on simultaneously. The first blue light B1 and the second blue light B2 are respectively converted into the first green light G1 and the second green light G2 via the same optical path as the timing for green light depicted in FIG. 2, and the red light R penetrates the first light splitting element 130 via the same optical path as the timing for red light depicted in FIG. 2. After being reflected by the first light splitting element 130, the first green light G1 and the second green light G2 overlap, on the optical path, with the red light R penetrating the first light splitting element 130 to form yellow light. The yellow light penetrates a light homogenizing element 150, so that the illumination system 100 outputs yellow light in an illumination beam I.

In the illumination system 100 according to an embodiment of the invention, since the illumination system 100 directly uses the red light R emitted by the red light source 110C as the red light of the illumination beam I, the illumination system 100 may output the illumination beam I with a wider color gamut range. Furthermore, the illumination system 100 uses the red light, the blue light, the green light, and the yellow light as basic light colors, and therefore the illumination beam I has relatively high white light brightness.

Figure 4A:
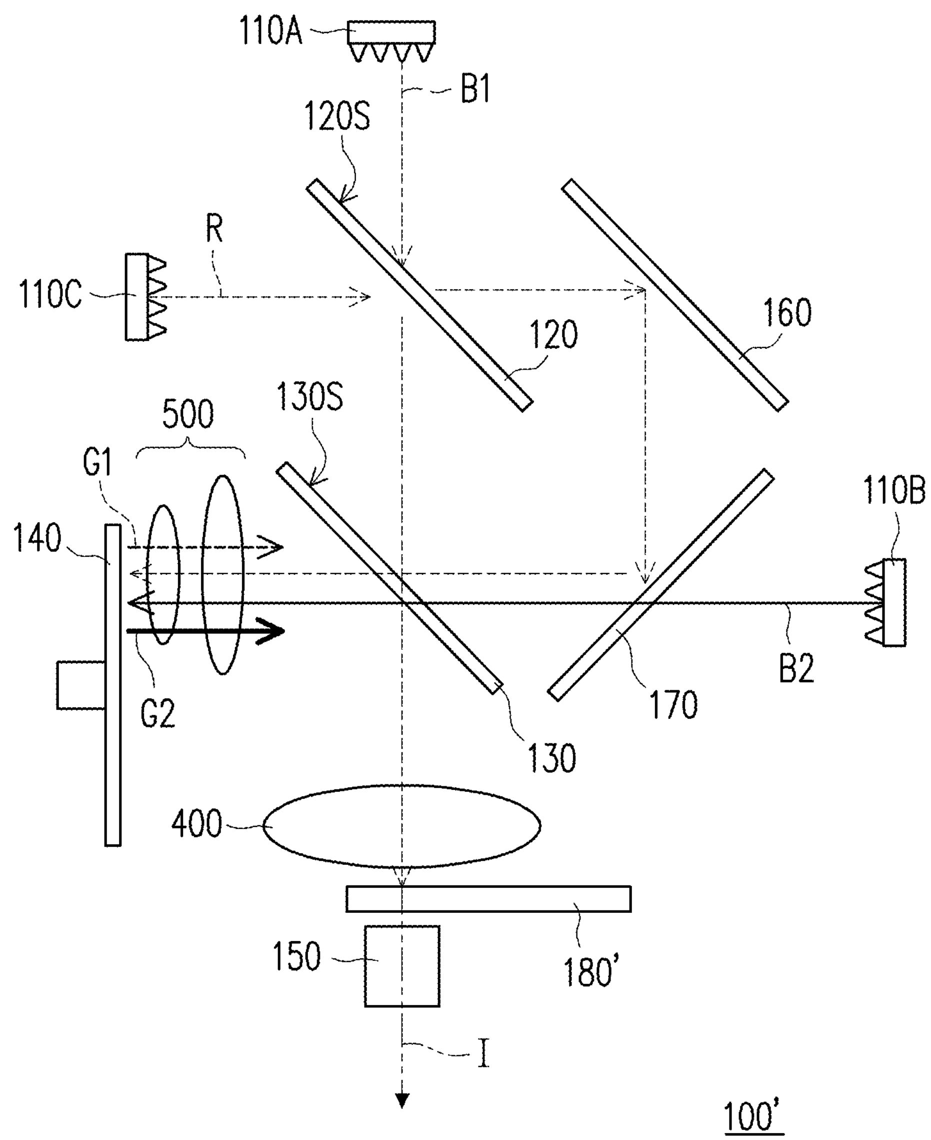
FIG. 4A is a schematic diagram of an optical path of an illumination system at a timing for nonblue light according to a second embodiment of the invention.
Figure 4B:
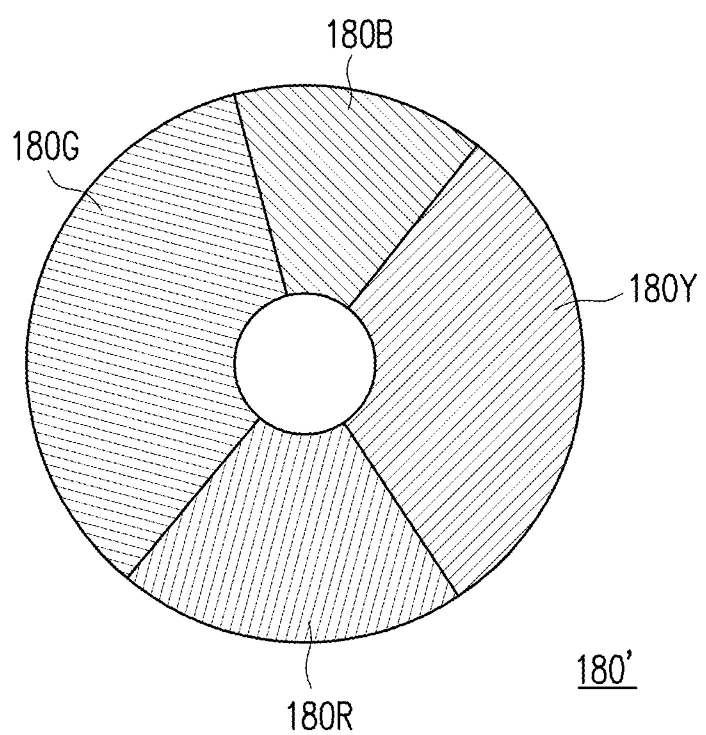
FIG. 4B is a schematic diagram of a color filter wheel of an illumination system according to an embodiment of the invention.

FIG. 4A is a schematic diagram of an optical path of an illumination system at a timing for nonblue light according to a second embodiment of the invention. FIG. 4B is a schematic diagram of a color filter wheel of an illumination system according to an embodiment of the invention. The illumination system 100' depicted in FIG. 4A is substantially the same as the illumination system 100 depicted in FIG. 1B, and the main differences are as follows. In the embodiment, the illumination system 100' further includes a color filter wheel 180'. With reference to FIG. 4A and FIG. 4B together, the color filter wheel 180' is disposed between the first light splitting element 130 and the light homogenizing element 150, where the color filter wheel 180' has a red light region 180R, a green light region 180G, a blue light region 180B, and a yellow light region 180Y. The red light region 180R, the green light region 180G, the blue light region 180B, and the yellow light region 180Y sequentially cut into the optical path of each corresponding color light, respectively cause light of the corresponding color light to pass, and filter out light of other colors.

Figure 5:
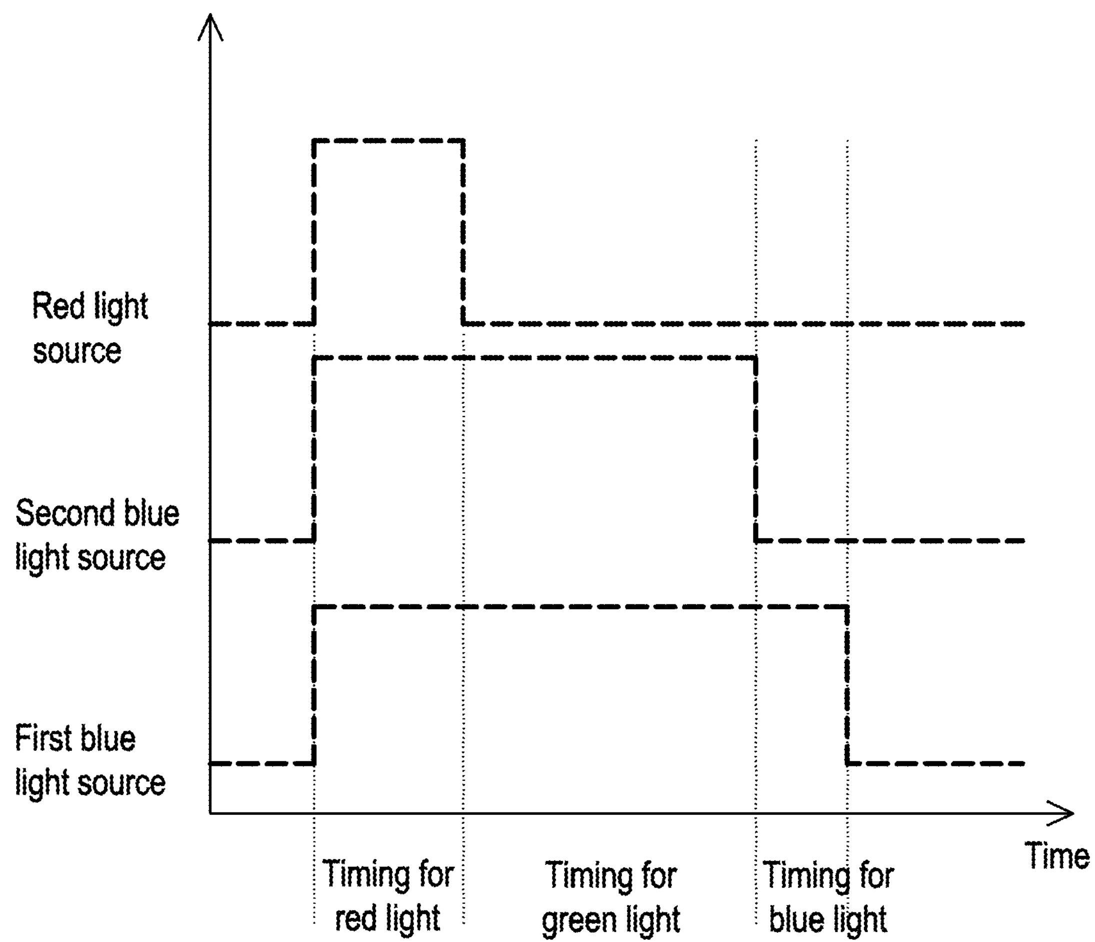
FIG. 5 is a schematic diagram of light sources being turned on at different timings in a third frame time according to an embodiment of the invention.

FIG. 5 is a schematic diagram of light sources being turned on at different timings in a third frame time according to an embodiment of the invention. A frame time depicted in FIG. 5 is similar to a frame time depicted in FIG. 2, and the main difference is: at a timing for red light of a frame time depicted in FIG. 5, in addition to the red light source 110C, the first blue light source 110A and the second blue light source 110B are also turned on simultaneously.

With reference to FIG. 4A, FIG. 4B, and FIG. 5, at the timing for blue light of the embodiment, the illumination system 100' similar to the illumination system 100 in FIG. 1A outputs blue light, and the main difference is: the first blue light B1 penetrating the lens 400 first passes through the blue light region 180B of the color filter wheel 180' and penetrates the light homogenizing element 150. In an embodiment, the blue light region 180B of the color filter wheel 180' may only be a light-transmitting region, and an optical element with a filtering effect may be omitted.

At a timing for green light of the embodiment, the illumination system 100' similar to the illumination system 100 in FIG. 1B outputs green light, and the main difference is: the first green light G1 and the second green light G2 penetrating the lens 400 first passes through the green light region 180G of the color filter wheel 180' and penetrates the light homogenizing element 150. In the embodiment, the green light region 180G of the color filter wheel 180' may filter out bluish or reddish parts of the first green light G1 and the second green light G2, so that the green light of the illumination beam I has better color purity. In another embodiment, the green light region 180G of the color filter wheel 180' may only be a light-transmitting region, and an optical element with a filtering effect may be omitted.

At a timing for red light provided in the embodiment, the first blue light B1 and the second blue light B2 are converted into the first green light G1 and the second green light G2 via the same optical path as depicted in FIG. 2. The first green light G1 and the second green light G2 are reflected by the first light splitting element 130, overlap with the red light R on the optical path, penetrate the red light region 180R of the color filter wheel 180', and penetrate the light homogenizing element 150, so that the illumination system 100' outputs red light of the illumination beam I. In the embodiment, the red light region 180R of the color filter wheel 180' may allow reddish parts of the first green light G1 and the second green light G2 to pass and filter out other parts, and forms red light with better brightness together with the red light R from the red light source 110C.

In the illumination system 100' of an embodiment of the invention, since the illumination system 100' outputs red light via the red light region 180R of the color filter wheel 180', and outputs green light via the green light region 180G of the color filter wheel 180', brightness of red light and green light of the illumination beam I is relatively high. Furthermore, the illumination system 100' uses the red light, the blue light, and the green light as basic light colors, and therefore the illumination beam I has relatively high color brightness. In addition, in the illumination system 100' corresponding to the frame time in FIG. 5, the yellow light region 180Y in FIG. 4B may be omitted for the color filter wheel 180' thereof.

Figure 6:
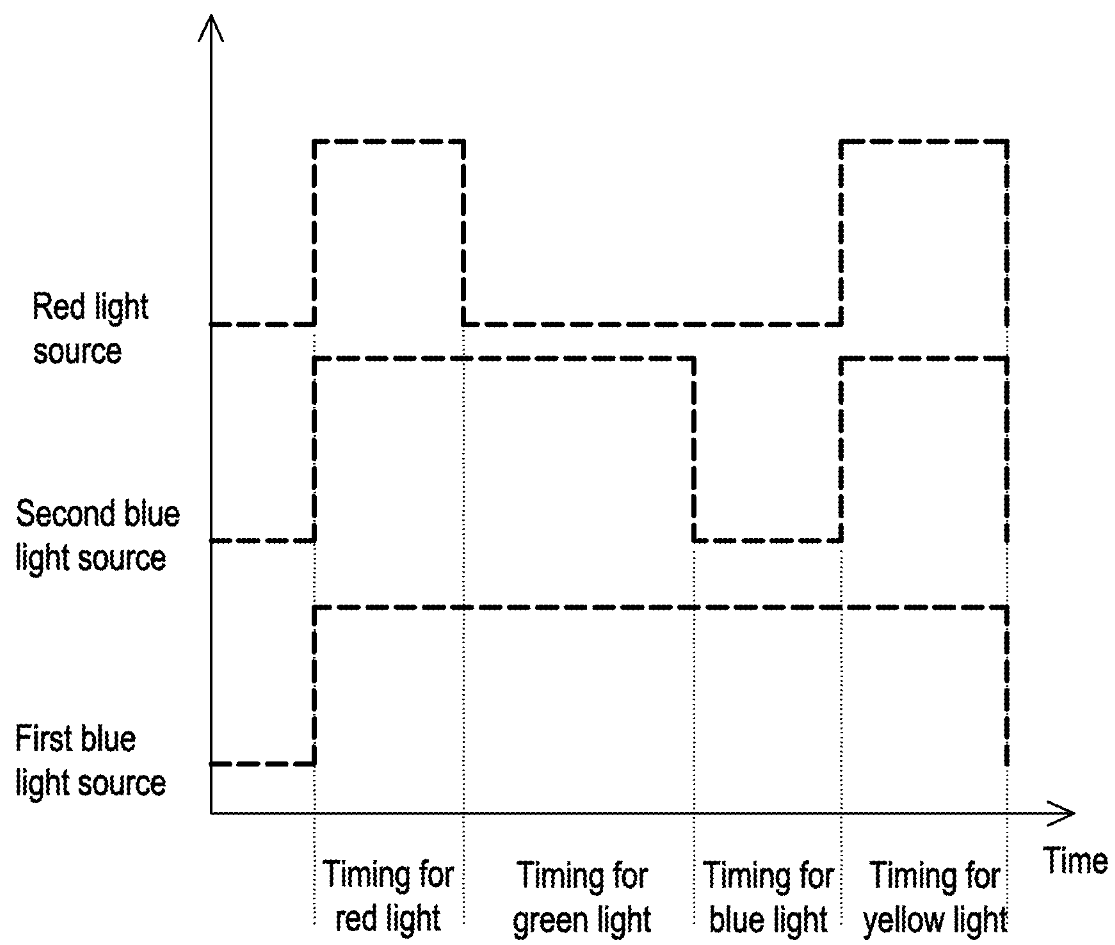
FIG. 6 is a schematic diagram of light sources being turned on at different timings in a fourth frame time according to an embodiment of the invention.

FIG. 6 is a schematic diagram of light sources being turned on at different timings in a fourth frame time according to an embodiment of the invention. A frame time depicted in FIG. 6 is similar to a frame time depicted in FIG. 5, and the main difference is as follows. The frame time depicted in FIG. 6 further includes a timing for yellow light.

With reference to FIG. 4A and FIG. 6, at the timing for yellow light as provided in the embodiment, the first blue light source 110A, the second blue light source 110B, and the red light source 110C are turned on simultaneously. The first blue light B1 and the second blue light B2 are converted into the first green light G1 and the second green light G2 via the same optical path as the timing for green light depicted in FIG. 5, and the red light R penetrates the first light splitting element 130 via the same optical path as the timing for red light depicted in FIG. 5. After being reflected by the first light splitting element 130, the first green light G1 and the second green light G2 overlap with the red light R on the optical path to form yellow light. The yellow light penetrates the yellow light region 180Y of the color filter wheel 180' and penetrates the light homogenizing element 150, so that the illumination system 100' outputs the yellow light in an illumination beam.

In the illumination system 100' of an embodiment of the invention, since the illumination system 100' outputs red light via the red light region 180R of the color filter wheel 180', and outputs green light via the green light region 180G of the color filter wheel 180', brightness of red light and green light of the illumination beam I is relatively high. Furthermore, the illumination system 100' uses the red light, the blue light, the green light, and the yellow light as basic light colors, and therefore the illumination beam I has relatively high white light brightness.

Figure 7A:
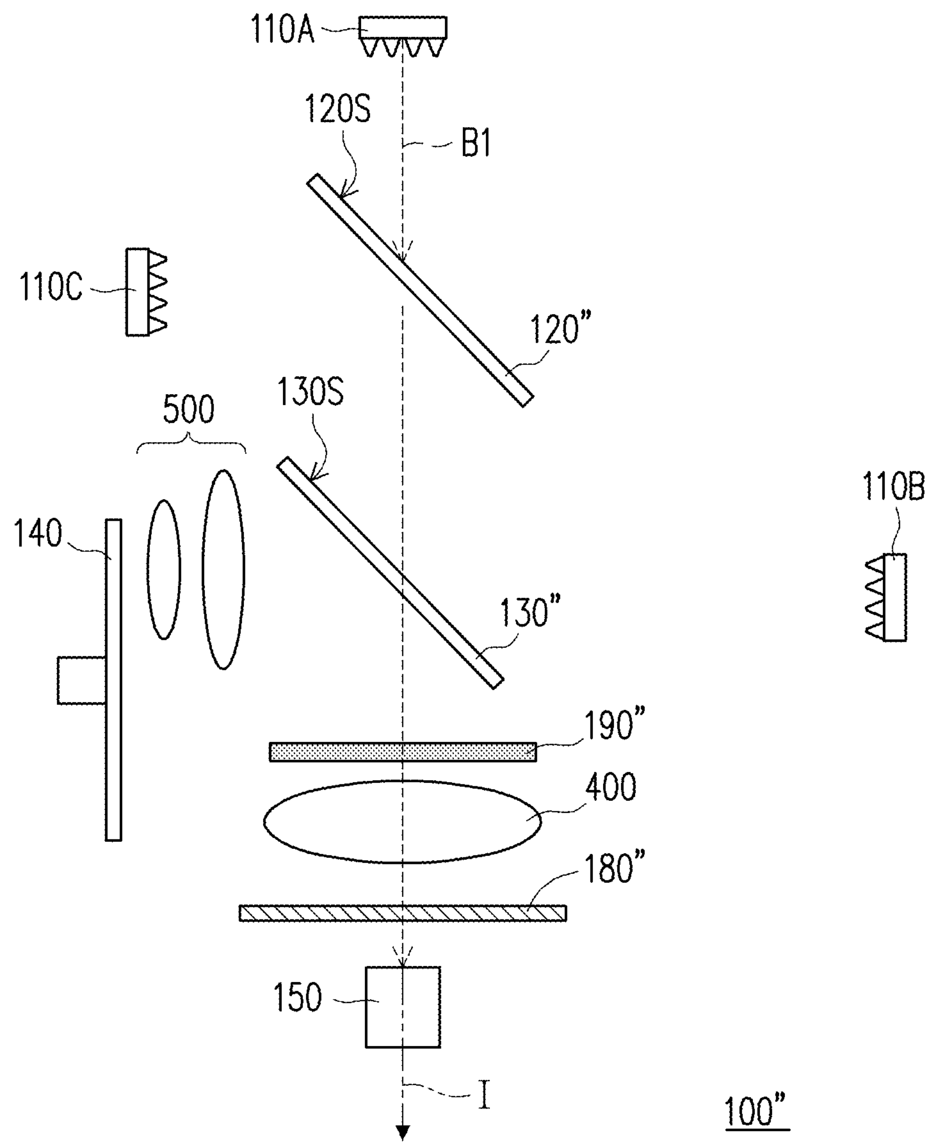
FIG. 7A is a schematic diagram of an optical path of an illumination system at a timing for blue light according to a third embodiment of the invention.
Figure 7B:
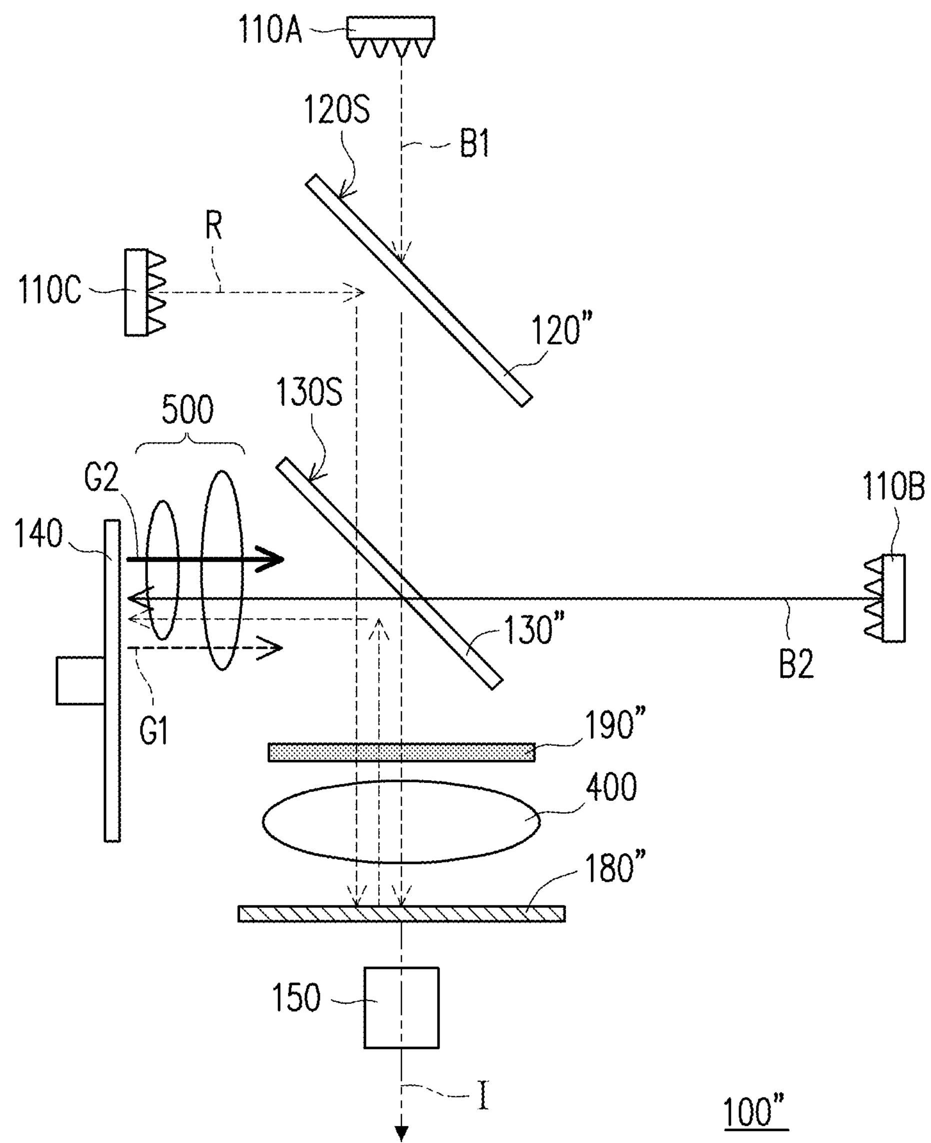
FIG. 7B is a schematic diagram of an optical path of an illumination system at a timing for nonblue light according to a third embodiment of the invention.
Figure 7C:
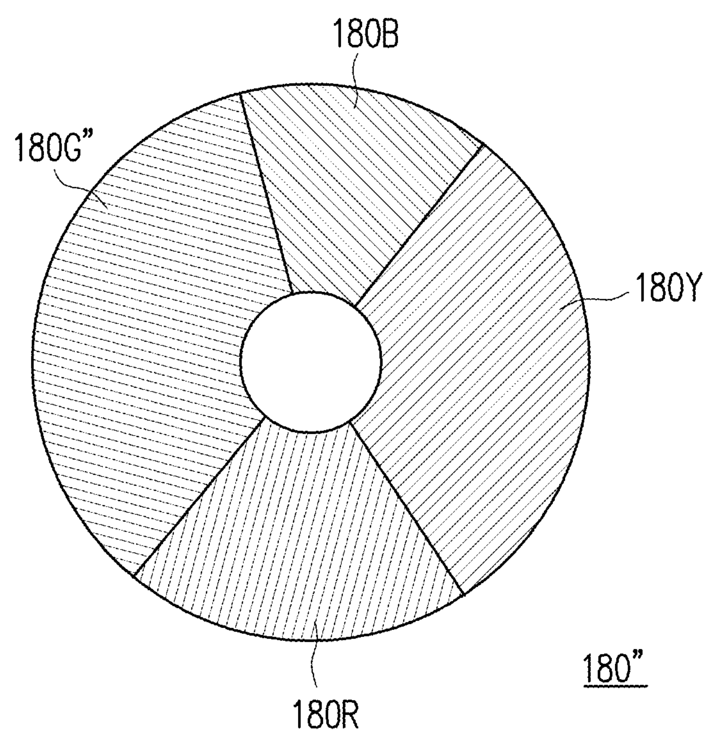
FIG. 7C is a schematic diagram of a color filter wheel of an illumination system according to another embodiment of the invention.

FIG. 7A is a schematic diagram of an optical path of an illumination system at a timing for blue light according to a third embodiment of the invention. FIG. 7B is a schematic diagram of an optical path of an illumination system at a timing for nonblue light according to a third embodiment of the invention. FIG. 7C is a schematic diagram of a color filter wheel of an illumination system according to another embodiment of the invention. An illumination system 100" depicted in FIGS. 7A (and FIG. 7B) is substantially similar to the illumination system 100 depicted in FIG. 1A, and the main differences are as follows. In the illumination system 100" depicted in FIG. 7A and FIG. 7B, the reflector 160 and the second light splitting element 170 of the illumination system 100 depicted in FIG. 1A are omitted in the illumination system 100". In addition, an optical path switching element 120" may be a wavelength dichroic mirror. The optical path switching element 120" is penetrated by blue light and reflects light of other light colors. Furthermore, the first light splitting element 130" may be a polarizing beam splitter, the polarizing beam splitter (the first light splitting element 130") may allow red light and blue light with the same polarization state to penetrate and reflect green light, and the first blue light B1 and the second blue light B2 have the same polarization state. For example, the first light splitting element 130" may be penetrated in a p-polarization state, and is used for reflection in an s-polarization state, and both the first blue light B1 and the second blue light B2 are in the p-polarization state. However, the utility is not limited thereto. The first light splitting element 130" may be penetrated in the s-polarization state and used for reflection in the p-polarization state. At this time, only the polarization states of the first blue light B1 and the second blue light B2 need to be correspondingly adjusted.

With reference to FIG. 7A to FIG. 7C, in the embodiment, the illumination system 100" further includes a phase retarder 190". The phase retarder 190" is disposed between the first light splitting element 130" and the light homogenizing element 150. Moreover, the illumination system 100" further includes a color filter wheel 180". The color filter wheel 180" is disposed between the phase retarder 190" and the light homogenizing element 150. The color filter wheel 180" depicted in FIG. 7C and the color filter wheel 180' depicted in FIG. 4B are roughly similar, and the main difference is as follows. The green light region 180G" of the color filter wheel 180" is penetrated by green light and reflects blue light.

With reference to FIG. 2 and FIG. 7A again, the timing for blue light of the illumination system 100" in the frame time depicted in FIG. 7A is similar to the timing for blue light of the illumination system 100 in the frame time depicted in FIG. 2, and the main difference is as follows. At the timing for blue light, in the process of transmitting the first blue light B1 from the first light splitting element 130" to the light homogenizing element 150, the first blue light B1 sequentially penetrates the phase retarder 190" and the blue light region 180B of the color filter wheel 180".

With reference to FIG. 2 and FIG. 7B again, the timings for red light and green light of the illumination system 100" in the frame time depicted in FIG. 7B are similar to the timings for red light and green light of the illumination system 100 in the frame time depicted in FIG. 2, and the main difference is as follows. At the timing for red light of the embodiment, in the process of transmitting the red light R from the first light splitting element 130" to the light homogenizing element 150, the red light R sequentially penetrates the phase retarder 190" and the red light region 180R of the color filter wheel 180". At the timing for green light, the first blue light B1 is sequentially transmitted from the optical path switching element 120" and the first light splitting element 130" to the phosphor wheel 140, and is converted into the optical path of the first green light G1. The first blue light B1 passing through the first light splitting element 130" sequentially penetrates the phase retarder 190", is reflected by a green light region 180G" of the color filter wheel 180", penetrates the phase retarder 190" via', is reflected by the first light splitting element 130", and is transmitted to the phosphor wheel 140. If the first blue light B1 and the second blue light B2 are both in the p-polarization state, for example, the polarization state of the first blue light B1 is converted into a right-handed circular polarization state when penetrating the phase retarder 190". The first blue light B1 in the right-handed circular polarization state is converted into first blue light B1 in a left-handed circular polarization state after being reflected by the green light region 180G" of the color filter wheel 180". The first blue light B1 in the left-handed circular polarization state is converted into first blue light B1 in the s-polarization state when penetrating the phase retarder 190", and therefore the first blue light B1 in the s-polarization state may be reflected by the first light splitting element 130" to the phosphor wheel 140, and the second blue light B2 in the p-polarization state directly penetrates the first light splitting element 130" and is transmitted to the phosphor wheel 140. Moreover, in the process of transmitting the first green light G1 and the second green light G2 from the first light splitting element 130" to the light homogenizing element 150, the first green light G1 and the second green light G2 are reflected by the first light splitting element 130" and sequentially penetrate the phase retarder 190" and the green light region 180 G" the color filter wheel 180".

With reference to FIG. 3 and FIG. 7B again, the timings of the illumination system 100" in the frame time depicted in FIG. 3 are similar to the timings of the illumination system 100" in the frame time depicted in FIG. 2, and the main difference is as follows. The frame time depicted in FIG. 3 further includes a timing for yellow light. At a timing for yellow light of as provided in the embodiment, the first blue light source 110A, the second blue light source 110B, and the red light source 110C are turned on simultaneously. The first blue light B1 and the second blue light B2 are converted into the first green light G1 and the second green light G2 via the same optical path as the timing for green light, and the red light R penetrates the first light splitting element 130" via the same optical path as the timing for red light. After being reflected by the first light splitting element 130", the first green light G1 and the second green light G2 overlap with the red light R on the optical path to form yellow light. The yellow light sequentially penetrates the phase retarder 190" and the yellow light region 180Y of the color filter wheel 180" and penetrates the light homogenizing element 150, so that the illumination system 100" outputs the yellow light in an illumination beam I.

With reference to FIG. 5 and FIG. 7B again, the timings of the illumination system 100" in the frame time depicted in FIG. 5 are similar to the timings of the illumination system 100" in the frame time depicted in FIG. 2, and the main difference is as follows. At a timing for red light of the embodiment, in addition to the red light source 110C, the first blue light source 110A and the second blue light source 110B are also turned on simultaneously. The first blue light B1 and the second blue light B2 are converted into the first green light G1 and the second green light G2 via the same optical path as the timing for green light. The first green light G1 and the second green light G2 are reflected by the first light splitting element 130", overlap with the red light R on the optical path, sequentially penetrate the phase retarder 190" and the red light region 180R of the color filter wheel 180", and penetrate the light homogenizing element 150, so that the illumination system 100" outputs red light of the illumination beam I.

With reference to FIG. 6 and FIG. 7B again, the timings of the illumination system 100" in the frame time depicted in FIG. 6 are similar to the timings of the illumination system 100" in the frame time depicted in FIG. 5, and the main difference is as follows. The frame time depicted in FIG. 6 further includes a timing for yellow light. At a timing for yellow light as provided in the embodiment, the first blue light source 110A, the second blue light source 110B, and the red light source 110C are turned on simultaneously. The first blue light B1 and the second blue light B2 are converted into the first green light G1 and the second green light G2 via the same optical path as the timing for green light, and the red light R penetrates the first light splitting element 130" via the same optical path as the timing for red light. After being reflected by the first light splitting element 130", the first green light G1 and the second green light G2 overlap with the red light R on the optical path to form yellow light. The yellow light sequentially penetrates the phase retarder 190" and the yellow light region 180Y of the color filter wheel 180" and penetrates the light homogenizing element 150, so that the illumination system 100" outputs the yellow light in an illumination beam I.

Based on the above, in the illumination system and the projection device according to the embodiment of the invention, due to the optical path switching element of the illumination system, at the timing for blue light, the first blue light is sequentially transmitted to the light homogenizing element via the optical path switching element and the first light splitting element and is not transmitted to the phosphor wheel, at the timings for green light and red light, the first blue light is sequentially transmitted to the phosphor wheel via the optical path switching element and the first light splitting element and is converted into green light. Therefore, the efficiency of the first blue light with a larger peak wavelength is effectively utilized, so that the overall efficiency of the illumination system and the projection device is improved. Furthermore, since the first blue light brings a better visual experience for users, and in a case that the usage rate of the first blue light is increased, the user experience is also better. Moreover, the utilization rate between the light sources is effectively controlled, thereby alleviating the problem of the light color generated by the illumination system and the projection device changing over time.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system configured to provide an illumination beam, wherein the illumination system comprises: a first blue light source, a second blue light source, an optical path switching element, a first light splitting element, a phosphor wheel, and a light homogenizing element, wherein the first blue light source is configured to emit first blue light;

the second blue light source is configured to emit second blue light, and a peak wavelength of the first blue light is greater than a peak wavelength of the second blue light;

the optical path switching element and the first light splitting element are disposed on a transmission path of the first blue light, the first light splitting element is disposed between the first blue light source and the light homogenizing element, and the optical path switching element is disposed between the first blue light source and the first light splitting element, and the optical path switching element is an optical wheel and has a penetration region and a reflection region;

the phosphor wheel is disposed on a transmission path of the second blue light, wherein at a timing for blue light, the penetration region of the optical path switching element cuts into the transmission path of the first blue light, the first blue light source is turned on, the second blue light source is not turned on, and the first blue light emitted from the first blue light source sequentially penetrates the penetration region, the first light splitting element and the light homogenizing element, so that the illumination system outputs blue light of the illumination beam;

at a timing for green light, the reflection region of the optical path switching element cuts into the transmission path of the first blue light, the first blue light source and the second blue light source are turned on simultaneously, the first blue light emitted from the first blue light source is transmitted to the first light splitting element and the phosphor wheel after being reflected by the reflection region, and the first blue light is converted into first green light via the phosphor wheel, the first green light is then transmitted to the first light splitting element and penetrates the light homogenizing element, and simultaneously the second blue light emitted from the second blue light source is sequentially transmitted to the first light splitting element and the phosphor wheel, the second blue light is converted into second green light via the phosphor wheel, and the second green light is then transmitted to the first light splitting element and penetrates the light homogenizing element, so that the illumination system outputs green light of the illumination beam, wherein the green light comprises the first green light and the second green light.

2. The illumination system according to claim 1, further comprising:

a red light source configured to emit red light, wherein at a timing for red light, the reflection region of the optical path switching element cuts into a transmission path of the red light, the red light source is turned on, the red light emitted from the red light source sequentially penetrates the first light splitting element and the light homogenizing element after being reflected by the optical path switching element, so that the illumination system outputs the red light of the illumination beam.

3. The illumination system according to claim 2, wherein an optical disk surface of the optical path switching element and a light splitting surface of the first light splitting element are parallel to each other.

4. The illumination system according to claim 3, wherein the phosphor wheel has a phosphor region;

when the illumination system is at the timing for green light, the phosphor region of the phosphor wheel is located on the transmission paths of the first blue light and the second blue light coming from the first light splitting element, and the first blue light and the second blue light are respectively converted into the first green light and the second green light via the phosphor region of the phosphor wheel.

5. The illumination system according to claim 3, further comprising:

a reflector, wherein the optical path switching element is disposed between the red light source and the reflector, and when the illumination system is at the timing for green light, the first blue light is transmitted from the optical path switching element to the first light splitting element via reflection of the reflector.

6. The illumination system according to claim 5, further comprising:

a second light splitting element disposed between the first light splitting element and the second blue light source, wherein the second light splitting element is a polarizing beam splitter or a wavelength dichroic mirror, and when the illumination system is at the timing for green light, the first blue light is transmitted from the reflector to the first light splitting element via reflection of the second light splitting element, and the second blue light penetrates the second light splitting element and is transmitted to the first light splitting element;

when the second light splitting element is the polarizing beam splitter, polarization states of the first blue light and the second blue light are different.

7. The illumination system according to claim 6, wherein at a timing for yellow light, the reflection region of the optical path switching element cuts into the transmission path of the first blue light and the transmission path of the red light, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light penetrating the first light splitting element on the optical path to form the yellow light, wherein the yellow light penetrates the light homogenizing element, so that the illumination system outputs the yellow light of the illumination beam.

8. The illumination system according to claim 6, further comprising:

a color filter wheel disposed between the first light splitting element and the light homogenizing element, wherein the color filter wheel has a red light region, a green light region, and a blue light region.

9. The illumination system according to claim 8, wherein at the timing for red light, in addition to the red light source, the first blue light source and the second blue light source are also turned on simultaneously, the first blue light and the second blue light are converted into the first green light and the second green light via the same optical path as the timing for green light, and after the first green light and the second green light are reflected by the first light splitting element, the first green light and the second green light overlap with the red light on the optical path, and the first green light, the second green light and the red light penetrate the red light region of the color filter wheel and penetrate the light homogenizing element, so that the illumination system outputs the red light of the illumination beam;

at the timing for green light, the first green light and the second green light penetrate the green light region of the color filter wheel and are transmitted to the light homogenizing element;

at the timing for blue light, the first blue light penetrates the blue light region of the color filter wheel and is transmitted to the light homogenizing element.

10. The illumination system according to claim 9, wherein the color filter wheel further has a yellow light region, and at a timing for yellow light, the reflection region of the optical path switching element cuts into the transmission path of the first blue light and the transmission path of the red light, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form the yellow light, wherein the yellow light penetrates the yellow light region of the color filter wheel and penetrates the light homogenizing element, so that the illumination system outputs the yellow light of the illumination beam.

11. The illumination system according to claim 1, wherein the optical path switching element is not located on the transmission path of the second blue light.

12. An illumination system configured to provide an illumination beam, wherein the illumination system comprises: a first blue light source, a second blue light source, an optical path switching element, a first light splitting element, a phosphor wheel, a color filter wheel, and a light homogenizing element, wherein the first blue light source is configured to emit first blue light;

the second blue light source is configured to emit second blue light, and a peak wavelength of the first blue light is greater than a peak wavelength of the second blue light;

the optical path switching element and the first light splitting element are disposed on a transmission path of the first blue light, the first light splitting element is disposed between the first blue light source and the light homogenizing element, and the optical path switching element is disposed between the first blue light source and the first light splitting element and is a wavelength dichroic mirror that is penetrable by blue light and reflects light of other colors;

the phosphor wheel is disposed on a transmission path of the second blue light;

the color filter wheel disposed between the first light splitting element and the light homogenizing element, wherein the color filter wheel has a green light region and a blue light region, and the green light region is penetrable by green light and reflects blue light wherein at a timing for blue light, the blue light region of the color filter wheel cuts into the transmission path of the first blue light, the first blue light source is turned on, the second blue light source is not turned on, and the first blue light emitted from the first blue light source is sequentially transmitted to the optical path switching element, the first light splitting element, the blue light region of the color filter wheel and penetrates the light homogenizing element, so that the illumination system outputs blue light of the illumination beam;

at a timing for green light, the green light region of the color filter wheel cuts into the transmission path of the first blue light and a transmission path of green light transmitted from the phosphor wheel, the first blue light source and the second blue light source are turned on simultaneously, the first blue light emitted from the first blue light source is sequentially transmitted to the optical path switching element, the first light splitting element and the color filter wheel, the first blue light is then reflected by the green light region of the color filter wheel to be transmitted to the first light splitting element, the first blue light reflected by the first light splitting element is transmitted to the phosphor wheel, the first blue light is converted into first green light via the phosphor wheel, the first green light is then transmitted to the first light splitting element, and penetrates the green light region and the light homogenizing element, and simultaneously the second blue light emitted from the second blue light source is sequentially transmitted to the first light splitting element and the phosphor wheel, the second blue light is converted into second green light via the phosphor wheel, and the second green light is then transmitted to the first light splitting element, and penetrates the green light region and the light homogenizing element, so that the illumination system outputs green light of the illumination beam, wherein the green light comprises the first green light and the second green light.

13. The illumination system according to claim 12, wherein the first blue light and the second blue light have an identical polarization state.

14. The illumination system according to claim 13, further comprising:

a phase retarder disposed between the first light splitting element and the light homogenizing element.

15. The illumination system according to claim 14, further comprising a red light source configured to emit red light, wherein the color filter wheel is disposed between the phase retarder and the light homogenizing element and further has a red light region, wherein at a timing for red light, the red light region of the color filter wheel cuts into a transmission path of the red light and the transmission path of the green light transmitted from the phosphor wheel, the red light source is turned on, the red light emitted from the red light source sequentially penetrates the first light splitting element and the light homogenizing element after being reflected by the optical path switching element, and then the red light penetrates the red light region of the color filter wheel, so that the illumination system outputs the red light of the illumination beam.

16. The illumination system according to claim 15, wherein at the timing for red light, in the process of transmitting the red light from the first light splitting element to the light homogenizing element, the red light sequentially penetrates the phase retarder and the red light region of the color filter wheel;

in timing for green light, the first blue light is transmitted from the first light splitting element to the phosphor wheel, and in process of being converted into the optical path of the first green light, the first blue light sequentially penetrates the phase retarder, is reflected by the green light region of the color filter wheel, penetrates the phase retarder, is reflected by the first light splitting element, and is transmitted to the phosphor wheel, and in the process of transmitting the first green light and the second green light from the first light splitting element to the light homogenizing element, the first green light and the second green light sequentially penetrate the phase retarder and the green light region of the color filter wheel;

at the timing for blue light, in the process of transmitting the first blue light from the first light splitting element to the light homogenizing element, the first blue light sequentially penetrates the phase retarder and the blue light region of the color filter wheel.

17. The illumination system according to claim 16, wherein the color filter wheel further has a yellow light region, and at a timing for yellow light, the yellow light region of the color filter wheel cuts into the transmission path of the red light and the transmission path of the green light transmitted from the phosphor wheel, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form the yellow light, wherein the yellow light sequentially penetrates the phase retarder and the yellow light region of the color filter wheel and penetrates the light homogenizing element, so that the illumination system outputs the yellow light of the illumination beam.

18. The illumination system according to claim 16, wherein at the timing for red light, in addition to the red light source, the first blue light source and the second blue light source are also turned on simultaneously, the first blue light and the second blue light are respectively converted into the first green light and the second green light via the same optical path as the timing for green light, and the first green light and the second green light are reflected by the first light splitting element, overlap with the red light on the optical path, sequentially penetrate the phase retarder and the red light region of the color filter wheel, and penetrate the light homogenizing element, so that the illumination system outputs the red light of the illumination beam.

19. The illumination system according to claim 18, wherein the color filter wheel further has a yellow light region, and at a timing for yellow light, the yellow light region of the color filter wheel cuts into the transmission path of the red light and the transmission path of the green light transmitted from the phosphor wheel, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form the yellow light, wherein the yellow light sequentially penetrates the phase retarder and the yellow light region of the color filter wheel and penetrates the light homogenizing element, so that the illumination system outputs the yellow light of the illumination beam.

20. A projection device, comprising: an illumination system, a light valve, and a projection lens, wherein the illumination system is configured to provide an illumination beam, the light valve is disposed on a transmission path of the illumination beam and configured to convert the illumination beam into an image beam, and the projection lens is disposed on a transmission path of the image beam and configured to project the image beam out of the projection device; the illumination system comprises: a first blue light source, a second blue light source, an optical path switching element, a first light splitting element, a phosphor wheel, and a light homogenizing element, wherein the first blue light source is configured to emit first blue light;

the second blue light source is configured to emit second blue light, and a peak wavelength of the first blue light is greater than a peak wavelength of the second blue light;

the optical path switching element and the first light splitting element are disposed on a transmission path of the first blue light, the first light splitting element is disposed between the first blue light source and the light homogenizing element, and the optical path switching element is disposed between the first blue light source and the first light splitting element, and the optical path switching element is an optical wheel and has a penetration region and a reflection region;

the phosphor wheel is disposed on a transmission path of the second blue light, wherein at a timing for blue light, the penetration region of the optical path switching element cuts into the transmission path of the first blue light, the first blue light source is turned on, the second blue light source is not turned on, and the first blue light emitted from the first blue light source sequentially penetrates the penetration region, and the first light splitting element and the light homogenizing element, so that the illumination system outputs blue light of the illumination beam;

at a timing for green light, the reflection region of the optical path switching element cuts into the transmission path of the first blue light, the first blue light source and the second blue light source are turned on simultaneously, the first blue light emitted from the first blue light source is transmitted to the first light splitting element and the phosphor wheel after being reflected by the reflection region, and the first blue light is converted into first green light via the phosphor wheel, the first green light is then transmitted to the first light splitting element and penetrates the light homogenizing element, and simultaneously the second blue light is sequentially transmitted to the first light splitting element and the phosphor wheel, the second blue light is converted into second green light via the phosphor wheel, and the second green light is then transmitted to the first light splitting element, and penetrates the light homogenizing element, so that the illumination system outputs green light of the illumination beam, wherein the green light comprises the first green light and the second green light.

21. The projection device according to claim 20, wherein the illumination system further comprises:

a red light source configured to emit red light, wherein at a timing for red light, the reflection region of the optical path switching element cuts into a transmission path of the red light, the red light source is turned on, the red light emitted from the red light source sequentially penetrates the first light splitting element and the light homogenizing element after being reflected by the optical path switching element, so that the illumination system outputs the red light of the illumination beam.

22. The projection device according to claim 21, wherein an optical disk surface of the optical path switching element and a light splitting surface of the first light splitting element are parallel to each other.

23. The projection device according to claim 22, wherein the phosphor wheel has a phosphor region;

when the illumination system is at the timing for green light, the phosphor region of the phosphor wheel is located on the transmission paths of the first blue light and the second blue light from the first light splitting element, and the first blue light and the second blue light are respectively converted into the first green light and the second green light via the phosphor region of the phosphor wheel.

24. The projection device according to claim 22, wherein the illumination system further comprises:

a reflector, wherein the optical path switching element is disposed between the red light source and the reflector, and when the illumination system is at the timing for green light, the first blue light is transmitted from the optical path switching element to the first light splitting element via reflection of the reflector.

25. The projection device according to claim 24, wherein the illumination system further comprises:

a second light splitting element disposed between the first light splitting element and the second blue light source, wherein the second light splitting element is a polarizing beam splitter or a wavelength dichroic mirror, and when the illumination system is at the timing for green light, the first blue light is transmitted from the reflector to the first light splitting element via reflection of the second light splitting element, and the second blue light first penetrates the second light splitting element and is transmitted to the first light splitting element;

when the second light splitting element is the polarizing beam splitter, polarization states of the first blue light and the second blue light are different.

26. The projection device according to claim 25, wherein at a timing for yellow light, the reflection region of the optical path switching element cuts into the transmission path of the first blue light and the transmission path of the red light, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form yellow light, wherein the yellow light penetrates the light homogenizing element, so that the illumination system outputs the yellow light of the illumination beam.

27. The projection device according to claim 25, wherein the illumination system further comprises:

a color filter wheel disposed between the first light splitting element and the light homogenizing element, wherein the color filter wheel has a red light region, a green light region, and a blue light region.

28. The projection device according to claim 27, wherein at the timing for red light, in addition to the red light source, the first blue light source and the second blue light source are also turned on simultaneously, the first blue light and the second blue light are respectively converted into the first green light and the second green light via the same optical path as the timing for green light, and after being reflected by the first light splitting element, the first green light and the second green light overlap with the red light on the optical path, penetrate the red light region of the color filter wheel, and penetrate the light homogenizing element, so that the illumination system outputs the red light of the illumination beam;

at the timing for green light, the first green light and the second green light penetrate the green light region of the color filter wheel and are transmitted to the light homogenizing element;

at the timing for blue light, the first blue light penetrates the blue light region of the color filter wheel and is transmitted to the light homogenizing element.

29. The projection device according to claim 28, wherein the color filter wheel further has a yellow light region, and at a timing for yellow light, the reflection region of the optical path switching element cuts into the transmission path of the first blue light and the transmission path of the red light, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form the yellow light, wherein the yellow light penetrates the yellow light region of the color filter wheel and penetrates the light homogenizing element, so that the illumination system outputs the yellow light of the illumination beam.

30. The projection device according to claim 20, wherein the optical path switching element is not located on the transmission path of the second blue light.

31. A projection device, comprising: an illumination system, a light valve, and a projection lens, wherein the illumination system is configured to provide an illumination beam, the light valve is disposed on a transmission path of the illumination beam and configured to convert the illumination beam into an image beam, and the projection lens is disposed on a transmission path of the image beam and configured to project the image beam out of the projection device, the illumination system comprises: a first blue light source, a second blue light source, an optical path switching element, a first light splitting element, a phosphor wheel, a color filter wheel, and a light homogenizing element, wherein the first blue light source is configured to emit first blue light;

the second blue light source is configured to emit second blue light, and a peak wavelength of the first blue light is greater than a peak wavelength of the second blue light;

the optical path switching element and the first light splitting element are disposed on a transmission path of the first blue light, the first light splitting element is disposed between the first blue light source and the light homogenizing element, and the optical path switching element is disposed between the first blue light source and the first light splitting element and is a wavelength dichroic mirror that is penetrable by blue light and reflects light of other colors;

the phosphor wheel is disposed on a transmission path of the second blue light;

the color filter wheel disposed between the first light splitting element and the light homogenizing element, wherein the color filter wheel has a green light region and a blue light region, and the green light region is penetrable by green light and reflects blue light, wherein at a timing for blue light, the blue light region of the color filter wheel cuts into the transmission path of the first blue light, the first blue light source is turned on, the second blue light source is not turned on, and the first blue light emitted from the first blue light source is sequentially transmitted to the optical path switching element, the first light splitting element, the blue light region of the color filter wheel and penetrates the light homogenizing element, so that the illumination system outputs blue light of the illumination beam;

at a timing for green light, the green light region of the color filter wheel cuts into the transmission path of the first blue light and a transmission path of green light transmitted from the phosphor wheel, the first blue light source and the second blue light source are turned on simultaneously, the first blue light emitted from the first blue light source is sequentially transmitted to the optical path switching element, the first light splitting element and is reflected by the green light region of the color filter wheel to be transmitted to the first light splitting element, the first blue light reflected by the first light splitting element is transmitted to the phosphor wheel, the first blue light is converted into first green light via the phosphor wheel, the first green light is then transmitted to the first light splitting element and penetrates the green light region and the light homogenizing element, and simultaneously the second blue light emitted from the second blue light source is sequentially transmitted to the first light splitting element and the phosphor wheel, the second blue light is converted into second green light via the phosphor wheel, and the second green light is then transmitted to the first light splitting element, and penetrates the green light region and the light homogenizing element, so that the illumination system outputs green light of the illumination beam, wherein the green light comprises the first green light and the second green light.

32. The projection device according to claim 31, wherein the first blue light and the second blue light have a same polarization state.

33. The projection device according to claim 32, wherein the illumination system further comprises:

a phase retarder disposed between the first light splitting element and the light homogenizing element.

34. The projection device according to claim 33, wherein the illumination system further comprises a red light source configured to emit red light, wherein the color filter wheel is disposed between the phase retarder and the light homogenizing element and further has a red light region; and at a timing for red light, the red light region of the color filter wheel cuts into a transmission path of the red light and the transmission path of the green light transmitted from the phosphor wheel, and the red light emitted by the red light source sequentially penetrates the first light splitting element and the light homogenizing element after being reflected by the optical path switching element, and then penetrates the red light region of the color filter wheel, so that the illumination system outputs the red light of the illumination beam.

35. The projection device according to claim 34, wherein at the timing for red light, in the process of transmitting the red light from the first light splitting element to the light homogenizing element, the red light sequentially penetrates the phase retarder and the red light region of the color filter wheel;

in timing for green light, the first blue light is transmitted from the first light splitting element to the phosphor wheel, and in process of being converted into the optical path of the first green light, the first blue light sequentially penetrates the phase retarder, is reflected by the green light region of the color filter wheel, penetrates the phase retarder, is reflected by the first light splitting element, and is transmitted to the phosphor wheel, and in the process of transmitting the first green light and the second green light from the first light splitting element to the light homogenizing element, the first green light and the second green light sequentially penetrate the phase retarder and the green light region of the color filter wheel;

at the timing for blue light, in the process of transmitting the first blue light from the first light splitting element to the light homogenizing element, the first blue light sequentially penetrates the phase retarder and the blue light region of the color filter wheel.

36. The projection device according to claim 35, wherein the color filter wheel further has a yellow light region, and at a timing for yellow light, the yellow light region of the color filter wheel cuts into the transmission path of the red light and the transmission path of the green light transmitted from the phosphor wheel, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form the yellow light, wherein the yellow light sequentially penetrates the phase retarder and the yellow light region of the color filter wheel and penetrates the light homogenizing element, so that the illumination system outputs the yellow light of the illumination beam;

the yellow light is projected onto the light valve after penetrating the projection lens.

37. The projection device according to claim 35, wherein at the timing for red light, in addition to the red light source, the first blue light source and the second blue light source are also turned on simultaneously, the first blue light and the second blue light are respectively converted into the first green light and the second green light via the same optical path as the timing for green light, and the first green light and the second green light are reflected by the first light splitting element, overlap with the red light on the optical path, sequentially penetrate the phase retarder and the red light region of the color filter wheel, and penetrate the light homogenizing element, so that the illumination system outputs the red light of the illumination beam.

38. The projection device according to claim 37, wherein the color filter wheel further has a yellow light region, and at a timing for yellow light, the yellow light region of the color filter wheel cuts into the transmission path of the red light and the transmission path of the green light transmitted from the phosphor wheel, the first blue light source, the second blue light source, and the red light source are turned on simultaneously, the first blue light and the second blue light are respectively converted into the first green light and the second green light via the same optical path as the timing for green light, the red light penetrates the first light splitting element via the same optical path as the timing for red light, and the first green light and the second green light are reflected by the first light splitting element and overlap with the red light on the optical path to form the yellow light, wherein the yellow light sequentially penetrates the phase retarder and the yellow light region of the color filter wheel and penetrates the light homogenizing element, so that the illumination system outputs the yellow light of the illumination beam.

* * * * *